United States Patent [19]

Roggero et al.

[11] 4,282,338
[45] Aug. 4, 1981

[54] PROCESS FOR THE PREPARATION OF GRAFTED POLYMERS OF α-SUBSTITUTED-β-PROPIOLACTONE ON AMORPHOUS BASE POLYMERS

[75] Inventors: Arnaldo Roggero; Luciano Zotteri, both of S. Donato Mi, Italy

[73] Assignee: Anic S.p.A., Palermo, Italy

[21] Appl. No.: 134,092

[22] Filed: Mar. 26, 1980

[30] Foreign Application Priority Data

Apr. 4, 1979 [IT] Italy ................ 21565 A/79

[51] Int. Cl.$^3$ .............. C08F 35/06; C08F 27/12
[52] U.S. Cl. .................... 525/153; 525/285; 525/296; 525/310; 525/312; 525/366; 525/369
[58] Field of Search ............. 525/153, 366, 369, 285, 525/310, 296, 361, 312

[56] References Cited

U.S. PATENT DOCUMENTS

| | | | |
|---|---|---|---|
| 3,627,837 | 12/1971 | Webb | 525/153 |
| 3,639,519 | 2/1972 | Hsieh et al. | 525/153 |
| 3,846,387 | 11/1974 | Su | 525/313 |
| 3,884,882 | 5/1975 | Caywood | 525/332 |
| 3,897,513 | 7/1975 | Sundet | 525/327 |
| 4,029,718 | 6/1977 | Sundet | 525/386 |
| 4,031,168 | 6/1977 | Sharkey et al. | 525/386 |

*Primary Examiner*—William F. Hamrock
*Attorney, Agent, or Firm*—Morgan, Finnegan, Pine, Foley & Lee

[57] ABSTRACT

A method is disclosed for preparing graft polymers of alpha-substituted-beta-propiolactones, comprising the step of providing anionic sites in an amorphous base polymer and reacting the anionic compound with an alpha-substituted-beta-propiolactone. Critical concentrations of unsaturation in the base polymer and critical quantities of the beta-propiolactone concerned are indicated.

16 Claims, No Drawings

PROCESS FOR THE PREPARATION OF GRAFTED POLYMERS OF α-SUBSTITUTED-β-PROPIOLACTONE ON AMORPHOUS BASE POLYMERS

This invention relates to a process for preparing graft polymers of α-substituted-β-propiolactones on ethylenepropylene base thermopolymers.

It is known to be able to synthesise random graft copolymers by grafting α-substituted-β-lactones and/or their copolymers onto amorphous base polymers (U.S. Pat. No. 3,897,513, July 29, 1975, and U.S. Pat. No. 4,029,718, June 14, 1977).

This process comprises contacting said amorphous polymers having at least one anionic site (which can be carbanion, carboxy or oxanion) with said β-lactones.

The amorphous base polymers described in this process include, inter alia, ethylene-propylene-nonconjugated diene terpolymers of which typically represented are 1-4 hexadiene, methylenenorbornene, ethylidenenorbornene, propenylnorbornene and dicyclopentadiene, and the corresponding ethylene-propylene tetrapolymers with two nonconjugated dienes.

For use in the aforesaid process, said polymers must contain, as already stated, reactive anionic sites which an be (A) carbanionic and/or (B) oxanionic (carboxy or alkoxy anions).

The first, (A), are prepared by metallation of suitable substrates, and the second (B) are prepared by synthesis of suitable copolymers (e.g. ethylene-methacrylic acid, ethylacrylates, and acrylic acid, ethylene, vinylacetate etc.), or by functionalisation (e.g. ethylene-propylene-nonconjugated diene functionalised with maleic anhydride or thioglycolic acid). With regard to obtaining sites of type (A) when operating on ethylene-propylene-nonconjugated diene substrates or respective tetrapolymers, the results are negative even when using very active metallation agents of the LiR-diamine type.

It is possible to obtain satisfactory metallation only when operating on substrates rich in unsaturations, such as polybutadiene or polyisoprene (D. P. TATE, A. F. HALASA, F. S. WEBB, R. W. KOCH and A. E. OBERSTER, J.Pol. Sci A-1,9,139–145, 1971). Even when functionalising ethylene-propylene-nonconjugated diene products with agents such as maleic anhydride (MA) or thioglycolic acid (TGA) to give sites of type (B), severe experimental conditions are required (e.g. high temperature in the case of MA, and high concentration of the functionalising agent in the case of TGA), which lead to undesirable sidechain reactions. It has now been found possible to carry out functionalisations of type (A) even starting from substrates of low unsaturation content, and functionalisations of type (B) in a more simple manner and with undoubted economic advantages. According to the process of the present invention, substrates are used consisting of amorphous polymers containing residual unsaturations at a concentration of between 0.01 and 1 mole/kg.

It has thus been found advantageous to use substrates constituted by ethylene, propylene and polymers containing at least one conjugated double bond system. In particular, terpolymers are used constituted by ethylene-propylene-triene in which the triene is of the following type:

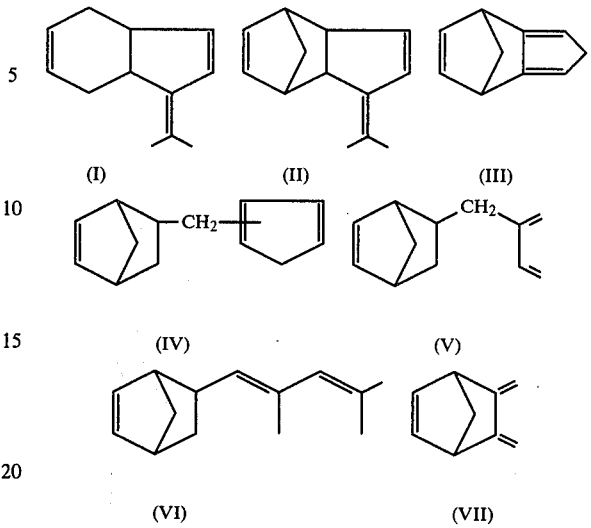

(I) (II) (III)
(IV) (V)
(VI) (VII)

The aforesaid trienes (in some cases various isomers are present) introduce into the terpolymers conjugated unsaturations which are particularly reactive and suitable for subsequent grafting.

Thus ethylene-propylene-triene and/or ethylene-propylene-triene$_1$-triene$_2$ substrates can be metallated, whereas under the same experimental conditions ethylene-propylene-diene and/or ethylene-propylene-diene$_1$-diene$_2$ substrates do not become metallated. The metallation agents used are preferably alkyllithium complexes with diamines and/or ethers.

Representative examples of alkyllithium are methyllithium, ethyllithium, n-butyllithium, sec-butyllithium and cyclohexyllithium.

Representative examples of diamines are N, N, N', N-tetramethylethylenediamine (TMEDA) and similar diamines with various alkyl groups, triethylenediamine and others.

Representative examples of ethers are tetrahydrofuran (THF), dioxane (DOX), ethyleneglycoldimethylether and the like. The soluble organosodiums described in U.S. Pat. No. 3,647,803 can also be usefully used as metallation agents, as in certain cases can alkyls (alone), hydrides and amides of alkaline metals. LiR-KOR complexes are also sometimes used.

The metallation is preferably carried out at ambient temperature, but higher or lower temperatures are acceptable. The order of mixing the polymer, Li or Na derivative and complexing agent (diamines or ethers) is not critical. The metallated polymers can be used in the grafting process either without further modification, or can be transformed into polymers containing carboxyl or hydroxyl groups by reaction with $CO_2$ or ethylene oxide respectively.

The functionalisation of determined substrates can also be carried out without necessarily passing through the metallation stage.

This is because the ethylene-propylene-nonconjugated diene substrates and relative tetrapolymers react with maleic anhydride (U.S. Pat. No. 3,884,882) and thioglycolic acid (U.S. Pat. No. 3,897,513) to give the desired functionalised substrates. However, in the first case it is necessary to use severe experimental conditions (very high temperature), because of which the polymers are never free from gel, and in the second case catalysts of radical type are required (azoisobutyronitrile) together with large quantities of reagent (high thioglycolic acid/double bond ratio), with the consequent difficulty of recovering the excess reagent, and of purifying the functionalised polymer.

If ethylene-propylene-triene substrates are used instead of ethylene-propylene-diene substrates, as stated heretofore, the functionalisation can be carried out in solution (aliphatic, aromatic, cycloaliphatic polar solvents or their mixtures), even at ambient temperature (higher temperatures up to 100° C. are acceptable) with, in the limit, stoichiometric ratios of functionalising agent to conjugated unsaturations in the substrate, and without the use of a catalyst.

Furthermore, the functionalisation does not subject the products to degradation or insolubilisation processes, and high purification is not necessary in removing the considerable excess of reagents used, which are sometimes injurious, and in any case difficult to extract.

Whereas substrates functionalised by metallation (anionic sites of type (A) are directly used in the grafting process, substrates containing acid, anhydride, ester and amide groups must be neutralised and/or saponified by a suitable base in order to provide the anionic sites of type (B) as stated heretofore, to which lactone monomers can be added under suitable conditions. Bases with quaternary ammonium cations and/or alkaline metals are preferred.

The addition can be conveniently carrried out in solvents at a temperature of between $-80°$ and $+200°$ C., and preferably between 20° and 120° C.

Different solvents can be used according to the type of initiator used and the solubility of the base polymer.

Representative solvents include one or more aliphatic, cycloaliphatic or aromatic hydrocarbons (hexane, cyclohexane, benzene and toluene), ethers (THF, DOX, ethyleneglycoldimethylether (EG DME), diethylene-glycoldimethylether (DEG DME) etc.), chlorinated substances (chloroform, tetrachloroethylene etc.), dimethylformamide, dimethylsulphoxide and others.

One solvent used for the solubilisation of $NR_4OH$ is methanol. When the polymer contains anhydride or carboxyl groups, the grafting reaction can in some cases be carried out in the molten state at a temperature of between 50° and 235° C.

The examples given hereinafter illustrate but do not limit the invention.

EXAMPLE 1

5 g of ethylene ($C_2$)-propylene ($C_3$)-(II) terpolymer containing 0.35 moles of conjugated unsaturations per kg are dissolved in 100 cm$^3$ of n-heptane and treated at ambient temperature with $2.0\times10^{-3}$ moles of n-butyllithium and $2.0\times10^{-3}$ moles of N,N,N',N'-tetramethylethylenediamine (TMEDA).

The solution instantaneously becomes yellow.

It is allowed to react for a few hours at a temperature of 50° C., and 2.0 g of pivalolactone (PVL) are then added. The colour immediately disappears and the viscosity increases. The test is interrupted after 2 hours by treatment with an excess of ethanol.

Extraction data for this product (7 g) confirm the graft nature of the product, which is insoluble in common $C_2$-$C_3$-(II) terpolymer solvents.

The PVL content in the graft product was determined by IR analysis (band at 765 cm$^{-1}$), and by analysing the oxygen in the product. The data obtained confirm that the conversion is quantitative, as could be deduced from the quantity of polymer isolated.

EXAMPLE 2

5 g of the $C_2$-$C_3$(II) terpolymer of example 1 dissolved in 200 cm$^3$ of n-heptane are treated at ambient temperature with $4.0\times10^{-3}$ moles of n-butyllithium and $4.0\times10^{-3}$ moles of TMEDA, and are allowed to react as heretofore described. $CO_2$ is introduced for 30 minutes at ambient temperature. The solution assumes a gel aspect, but is made soluble by treatment with 5 cm$^3$ of methyl alcohol and 0.5 cm$^3$ of HCl, and is then purified by dissolving in THF and precipitating with methanol. An IR examination on the product shows the presence of absorption at 1,700 cm$^{-1}$, attributable to the COOH group (0.21 moles/kg), and a simultaneous UV analysis shows the disappearance of about 60% of conjugated double bonds. ($\lambda=252$ L nm with $\epsilon=14,600$ liters/mol.cm).

EXAMPLE 3

4 g of $C_2$-$C_3$-EBN terpolymer (about 0.7 moles/kg of unsaturations) are dissolved in 200 cm$^3$ of n-heptane, and $6.4\times10^{-3}$ moles of n-butyllithium and $6.4\times10^{-3}$ moles of DMEDA are added at ambient temperature, the mixture then being left to react as described heretofore.

$CO_2$ is then added and the procedure continued as described heretofore.

An IR examination on the product shows nothing more than traces of the presence of absorption attributable to the COOH group.

EXAMPLE 4

5 g of terpolymer COOH-functionalised (0.21 moles/kg) as described in example 2 are dissolved in 100 cm$^3$ of toluene and 100 cm$^3$ of tetrahydrofuran.

$0.7\times10^{-3}$ moles of a solution (0.7 M) of tetrabutylammoniumhydroxide in methanol are added to this solution. The mixture is stirred at 60° C. for some time, and 1.5 g of PVL are then added.

The reaction is carried out for 2 hours, the reaction mixture is cooled to ambient temperature, acidified with HCl ($2.0\times10^{-3}$ moles) and methanol added to precipitate the product. 6.5 g of product insoluble in the common terpolymer solvents are obtained, and an IR and elementary oxygen analysis show it to contain 23% of PVL.

The DTA examination shows, in addition to the soft phase Tg, a melting point of about 175°–180° C. attributable to the crystalline hard phase of the grafted poly PVL.

An SSL (soft sequence length) and HSL (hard sequence length) calculation gives:

$$SSL = \frac{1000 \text{ g/kg}}{0.21 \text{ moles COOH/kg}} = \text{approximately } 4750 \text{ g/mole}$$

$$HSL = \frac{0.015 \text{ moles } PVL \times 100 \text{ g/mole } PVL}{0.00105 \text{ moles COOH}} = 1430 \text{ g/mole}$$

EXAMPLES 5-11

The $C_2$-$C_3$-(IV), $C_2$-$C_3$-ethylidenenorbornene (ENB), and $C_2$-$C_3$-1,4-hexadiene (EX) terpolymers are treated in a toluene solution with maleic anhydride under the conditions given in Table 1.

TABLE 1

| TEST | TERPOLYMER TYPE | UNSATURATION MOL/KG. | MOLAR RATIO MALEIC ANHYDRIDE UNSATURATION | TIME h. | TEMPERATURE °C. | CONTENT OF ANHYDRIDE GROUPS MOL/KG. |
|---|---|---|---|---|---|---|
| 5  | $C_2$—$C_3$—IV  | 0.15 | 1.0 | 8 | 25 | 0.12 |
| 6  | "               | 0.20 | 1.5 | 4 | 60 | 0.17 |
| 7  | "               | 0.25 | 2.0 | 4 | 60 | 0.22 |
| 8  | "               | 0.30 | 5.0 | 4 | 25 | 0.28 |
| 9  | "               | 0.40 | 5.0 | 4 | 60 | 0.40 |
| 10 | $C_2$—$C_3$—ENB | 0.70 | 5.0 | 8 | 60 | 0 |
| 11 | $C_2C_3$—EX     | 0.61 | 5.0 | 8 | 60 | 0 |

The functionalised polymers are completely soluble, and their viscosity is comparable with the viscosity of the starting polymer.

The content of anhydride groups in the polymer after functionalising was found by IR analysis (band at 1773 cm$^{-1}$), and UV analysis showed the almost total disappearance of the absorption ($\lambda=255.5$ nm with $\epsilon=3900$ liters/mole.cm) typical of the conjugated double bonds of the $C_2$-$C_3$-(IV) terpolymer.

EXAMPLES 12-17

The functionalised polymers of examples 5, 6 and 7 were grafted with PVL in accordance with the experimental procedure already described in example 4, under the conditions given in table 2.

TABLE 2

| TEST | CONTENT OF ANHYDRIDE GROUPS MOLE/KG | TBA—OH MOLES 10$^{-3}$ | PVL MONOMER g | PVL IN POLYMER % WEIGHT | SSL g/MOLE | HSL g/MOLE |
|---|---|---|---|---|---|---|
| 12 | 0.12 | 0.5 | 1.4 | 15 | 8300 | 1420 |
| 13 | 0.12 | 0.5 | 3.4 | 30 | 8300 | 3430 |
| 14 | 0.17 | 0.7 | 1.4 | 15 | 5900 | 1030 |
| 15 | 0.17 | 0.7 | 3.4 | 30 | 5900 | 2520 |
| 16 | 0.22 | 0.9 | 1.4 | 15 | 4550 | 820 |
| 17 | 0.22 | 0.9 | 3.4 | 30 | 4550 | 1950 |

Each test was carried out with 8 g of polymer dissolved in 150 cm$^3$ of toluene and 150 cm$^3$ of tetrahydrofuran, at 60° C. for 2 hours.

The tetrabutylammoniumhydroxide (TBAOH) was allowed to interact with the functionalised polymer for some time before adding the PVL.

The yields are quantitative in all cases.

The PVL content of the polymer was determined as described in example 1.

A preliminary technological evaluation of these products after compression moulding gave the reults indicated in table 3. This table also gives the Tm values for the grafted PPVL, as obtained from DSC data.

TABLE 3

| TEST | STRESS AT 100% ELONGATION MPa | STRESS AT BREAK POINT MPa | ELONGATION AT BREAK POINT % | Tm °C. |
|---|---|---|---|---|
| 12 | 2   | 13.5 | 770 | 167 |
| 13 | 3.3 | 23.0 | 775 | 187 |
| 14 | 3.3 | 14.5 | 650 | 147 |
| 15 | 3.8 | 21   | 650 | 182 |
| 16 | 4.0 | 15.8 | 530 | 117-127 |
| 17 | 7.8 | 19.5 | 400 | 167 |

This table shows that the materials examined have stress-elongation properties similar to those of a filled and vulcanised EPDM.

In addition to good elastic properties, these products have extremely low values of permanent deformation under tension for 100% elongation.

EXAMPLE 18

5 g of $C_2$-$C_3$-(IV) terpolymer containing 0.3 moles of conjugated unsaturations are treated at 60° C. in a toluene solution (200 cm$^3$) with 7.5 mmoles of methylacrylate, and are left to react for about 8 hours.

The polymer is isolated by precipitation with acetone, and an IR examination shows absorption of the ester group at 1730 cm$^{-1}$ in a quantity of 0.28 moles/kg.

A UV examination correspondingly reveals the almost total disappearance of adsorption at 255.5 nm of conjugated double bonds. The functionalised product is redissolved in 150 cm$^3$ of toluene and 50 cm$^3$ of THF, and $1.0\times10^{-3}$ moles of tetra-n-butylammoniumhydroxide (0.7 molar solution in methanol) are added, and the mixture maintained at 70° C. for 2 hours.

About 1.5 g of PVL are then added, and the procedure is continued as heretofore described.

EXAMPLE 19

10 g of $C_2$-$C_3$-(VI) terpolymer containing 0.4 moles of conjugated unsaturations per kg and dissolved in 500 cm$^3$ of toluene are treated at 60° C. with $20\times10^{-3}$ moles of maleic anhydride, the mixture being maintained at this temperature for some hours.

The product is isolated by precipitation with acetone, and shows a content of 0.4 moles/kg of anhydride groups.

This polymer is dissolved in 400 cm$^3$ of toluene and 100 cm$^3$ of tetrahydrofuran, and tetraalkylmmoniumhydroxide and PVL are added to the mixture as already described.

EXAMPLE 20

5 g of a $C_2$-$C_3$-(IV) terpolymer containing 0.20 moles/kg of conjugated unsaturations are treated in 300 cm$^3$ of a toluene-tetrahydrofuran mixture (1:1 by volume) with the stoichiometric quantity (with respect to the unsaturation) of NaH at 60° for 8 hours. If an excess of NaH is used in order to have more rapid metallation, the unreacted NaH must be filtered off before passing to the next grafting stage.

2 g of PVL are then added, and after 2 hours 6.8 g of polymer are isolated, containing 26.8% by weight of PVL, as shown by IR analysis.

EXAMPLE 21

The $C_2$–$C_3$-(I) terpolymer in cyclohexane is reacted with the butylsodium-TMEDA system, metallation being carried out at ambient temperature.

The PVL is added, and the procedure as heretofore described is followed.

EXAMPLE 22

The $C_2$–$C_3$-(III) terpolymer in cyclohexane is reacted with the $LiNR_2$ system, metallation being carried out at ambient temperature. The PVL is added, and the procedure as heretofore described is followed.

EXAMPLE 23

The $C_2$–$C_3$-(V) terpolymer in cyclohexane is reacted with the n.But.Li+But.KOT system, metallation being carried out at ambient temperature. The PVL is added, and the method as heretofore described is followed.

EXAMPLE 24

The method of example 4 is followed, with the difference that instead of adding PVL, a mixture of PVL and $\alpha,\alpha$-di-n-propyl-$\beta$-propiolactone (0.75 g and 0.75 g respectively) is added. The procedure as heretofore described is then followed.

We claim:

1. A process for preparing graft polymers of $\alpha$-substituted-$\beta$-propiolactones which comprises reacting an ethylene-propylene-triene terpolymer wherein said triene component is selected from

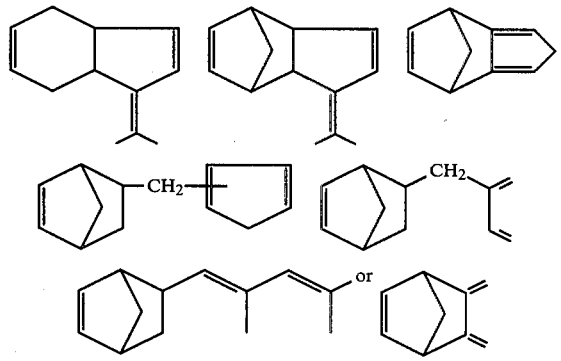

and wherein said terpolymer has an unsaturation concentration of between 0.01 and 1 mole/kg and a functionalizing agent to form an anionic site on said terpolymer, said reaction carried out in a solvent at a temperature of from ambient to 100° C., then reacting the resulting functionalized terpolymer having anionic sites with an $\alpha$-substituted-$\beta$-propiolactone wherein the molar ratio of said $\beta$-propiolactone to said anionic sites is from 3 to 1000, in a solvent at a temperature from −80° to 200° C.

2. The process of claim 1 wherein said functionalization agent is a metallation agent selected from alkyllithium compounds, organosodiums, alkali metal alkyls, alkali metal hydrides or LIR-KOR complexes.

3. The process of claim 2 wherein said alkyllithium compound is complexed with a diamine, ether or mixtures thereof.

4. The process of claim 3 wherein said diamine complexing agent is selected from $N,N,N^1,N^1$-tetramethylethylenediamine (TMEDA) or triethylenediamine and said ether is selected from tetrahydrofuran, dioxane or ethyleneglycoldimethylether.

5. The process of claim 3 wherein said alkyllithium compound is selected from methyllithium, ethyllithium, n-butyllithium, sec-butyllithium, or cyclohexyllithium.

6. The process of claim 2 wherein said alkali metal hydride is sodium hydride.

7. The process of claim 1 wherein said functionalization agent is selected from acids or acid precursors, anhydrides, esters or amides and the resulting acid, anhydride, ester or amide group is neutralized to provide the anionic sites.

8. The process of claim 7 wherein said neutralization is effected by treatment with a quaternary ammonium base or an alkali metal base.

9. The process of claim 7 wherein said functionalization agent is maleic anhydride.

10. The process of claim 7 wherein said functionalization agent is methylacrylate.

11. The process of claim 2 wherein subsequent to said metallization reaction, the resulting product is treated with carbon dioxide or ethylene oxide and the resulting carboxylated or hydroxylated product is neutralized with a quaternary ammonium base or alkali metal base.

12. The process of claim 1 wherein the solvent employed in the functionalization reaction is selected from aliphatic, aromatic or cycloaliphatic hydrocarbons or mixtures thereof.

13. The process of claim 1 wherein the solvent employed in the propiolactone reaction step is selected from hexane, cyclohexane, benzene, toluene, tetrahydrofuran, dioxane, ethyleneglycoldimethylether, diethyleneglycoldimethylether, chloroform, tetrachloromethylene, dimethylformamide or dimethylsulfoxide.

14. The process of claim 1 wherein said $\beta$-propiolactone is pivalolactone (PVL).

15. The process of claim 1 wherein said $\beta$-propiolactone is $\alpha,\alpha$-di-n-propyl-$\beta$-propiolactone.

16. The process of claim 1 wherein in the $\beta$-propiolactone reaction, up to 150% by weight of the base polymer of $\beta$-propiolactone is employed.

* * * * *